(No Model.)  H. C. REW.  4 Sheets—Sheet 3.
PROCESS OF MAKING GAS.
No. 389,106.  Patented Sept. 4, 1888.
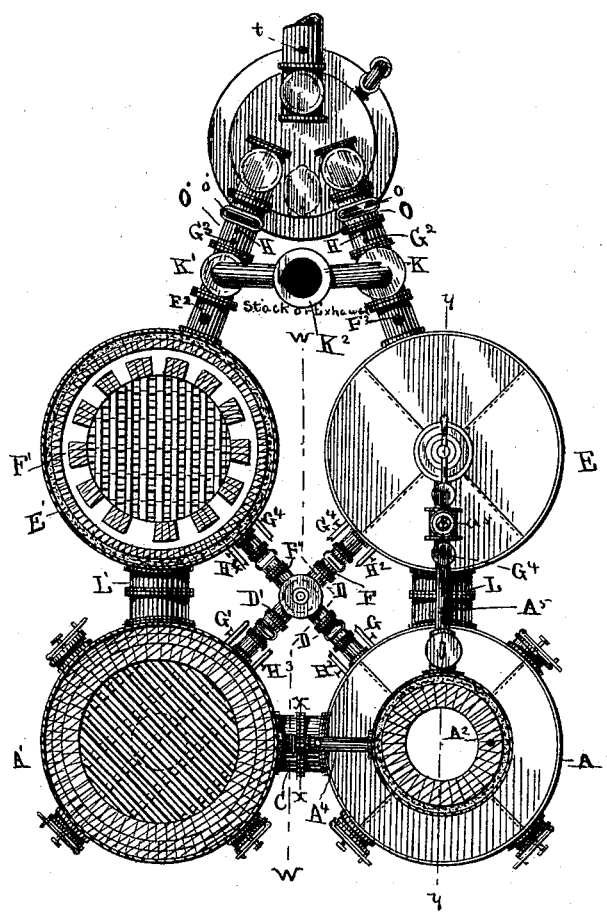
WITNESSES.
Morris A. Clark.
Florence Davies.
INVENTOR.
Henry C. Rew,
by
Benj. R. Catlin,

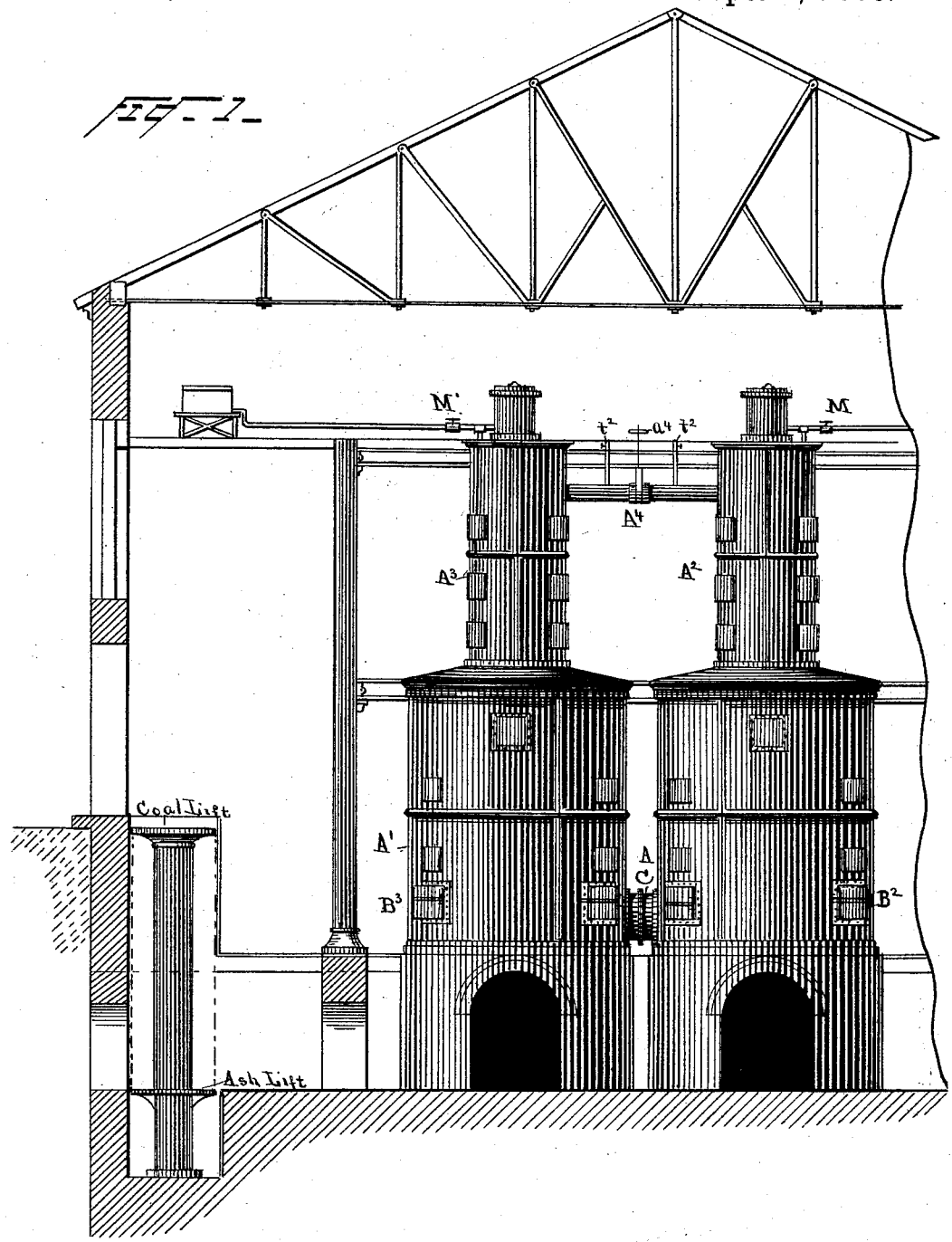

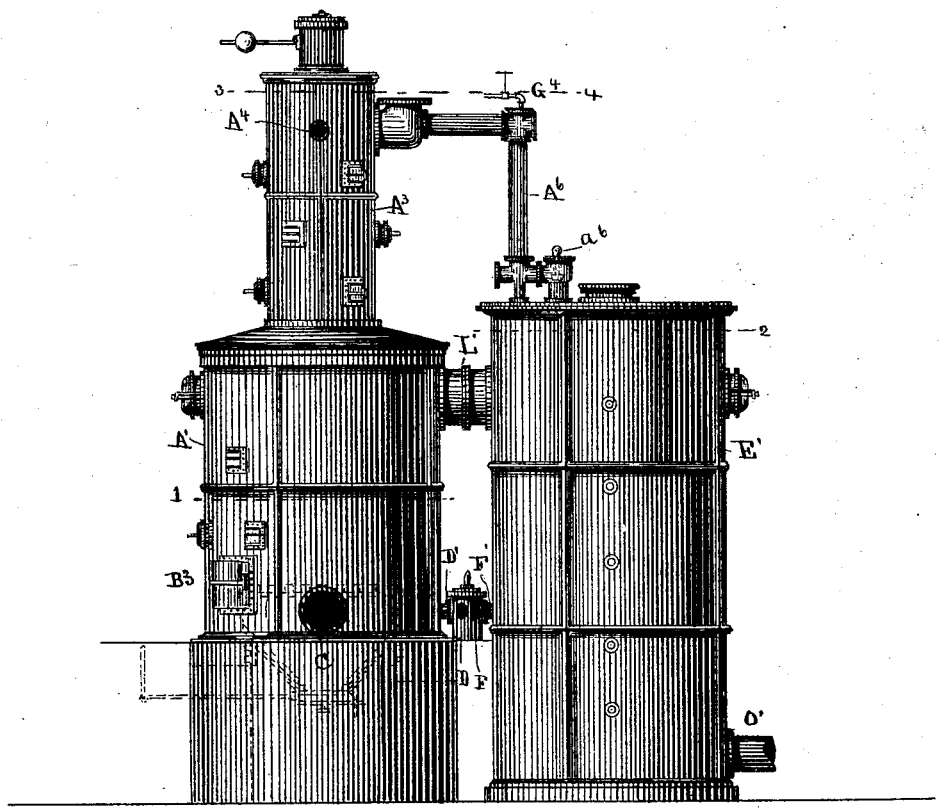

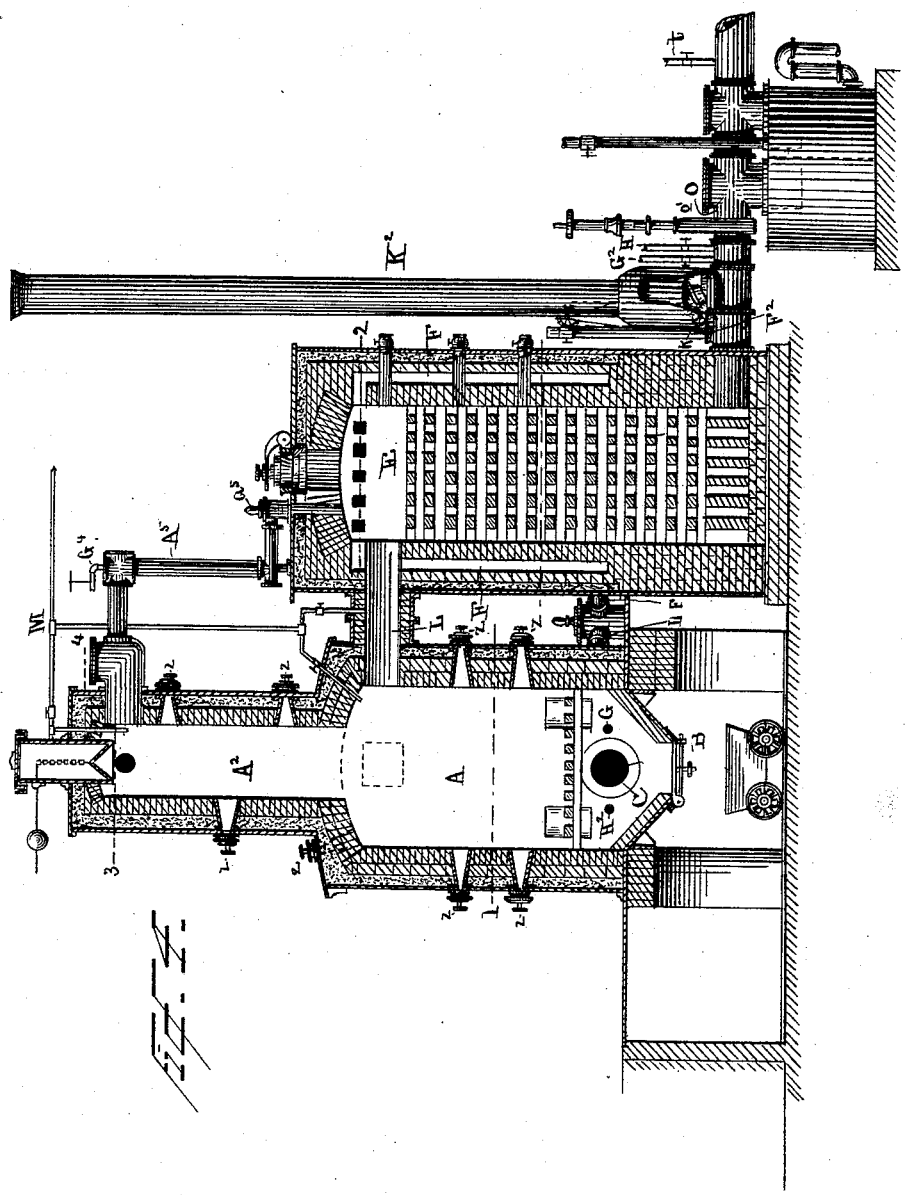

United States Patent Office.

HENRY C. REW, OF CHICAGO, ILLINOIS.

PROCESS OF MAKING GAS.

SPECIFICATION forming part of Letters Patent No. 389,106, dated September 4, 1888.

Original application filed May 18, 1887, Serial No. 238,691. Divided and this application filed November 18, 1887. Serial No. 255,481. (No model.)

*To all whom it may concern:*

Be it known that I, HENRY C. REW, a citizen of the United States, residing at Chicago, in the county of Cook and State of Illinois, have invented certain new and useful Improvements in the Process of Making Gas; and I do hereby declare the following to be a full, clear, and exact description of the invention, such as will enable others skilled in the art to which it appertains to make and use the same.

The present invention embraces improvements upon certain inventions described in Letters Patent of the United States of America heretofore granted to me, as follows, to wit: Patent No. 290,926, dated December 25, A. D. 1883, which related to the continuous generation and fixing of gas, oil-vapors being introduced into the fixing-chamber to enrich the gas from the generator, and fixing-chambers being alternately heated by the combustion of gas free from dust or ash, and the introduction of nitrogen into the final product being avoided; Patent No. 339,471, dated April 6, A. D. 1886, which related to a method of heating both superheating and fixing chambers simultaneously by forcing hot products of combustion generated in two furnaces connected at the bottom downwardly through them, the heat of the latter being maintained by conducting away the manufactured gas in a similar manner, said superheating and fixing chambers containing refractory material extended from the bottom of the apparatus to about its full height, and means were provided for introducing oil into the fixing-chambers, (the use of external metallic flues for the passage of products or gases to the chambers being avoided;) Patent No. 339,472, dated April 6, A. D. 1886, relates to the decomposition of steam in the presence of gas in a superheated chamber containing refractory material and the use of oil-vapors to convert carbonic acid thus produced to carbonic oxide and to enrich the final product, the fuel in chambers located above the chambers containing refractory material being heated by expansion and direct circulation of the gases used in heating the latter chambers and by conduction through open flues in the masonry to save heat that would otherwise be radiated upwardly into the open air and lost; Patent No. 341,506, dated May 11, A. D. 1886, which related to a method of heating both superheating and fixing chambers simultaneously by forcing hot products of combustion generated in two furnaces connected at the top downwardly through them, the heat of the latter being maintained, as in Patent No. 339,471, by conducting away the manufactured gas in a similar manner, said superheating and fixing chambers in this case being located immediately below the fuel-chambers.

The object of the present invention is to provide efficient means for utilizing bituminous coal in the manufacture of illuminating-gas by methods and apparatus which, though they have a general resemblance to matters heretofore known, are new in respect to the methods or processes hereinafter pointed out in the claims, the operation being such that hydrocarbon vapors and gases are expelled from bituminous coal without the passage therethrough of the heated products of combustion, means being provided for conducting the hydrocarbon vapors and gases from the retort or compartment adapted for coking coal into the current of gases generated by the decomposition of steam, air, or gas in and by the incandescent coke, said coke being supplied by gravity from said compartment to the compartment or chamber adapted for the decomposition of steam, all as specified hereinafter, whereby the coal can be coked and the coke converted into gas in one continuous operation and the latter enriched from the coking compartment or chamber without carbonizing or burning the hydrocarbon vapors and without suspending the operation to introduce either coal or coke, and whereby the heat radiated and conducted directly from the generating-compartments and regenerators to the coal in the coking compartments or chambers is utilized to expel volatile and gaseous hydrocarbons from the bituminous coal employed.

In the accompanying drawings, which form part of the specification, Figure 1 represents a front elevation of a gas apparatus, showing the inclosing structure in section; Fig. 2, a side view of the furnace and regenerator, looking to the left, and partly in section on the line $w$ $w$, Fig. 3; Fig. 3, a plan view of the apparatus, partly in section; and Fig. 4 is a central vertical section of the furnace and regenerator in line $y$ $y$ of Fig. 3, the horizontal branch outlet-pipe and the stack being shown in full lines, and the wall of the connecting vertical branch pipe being broken away to disclose the valve adapted to close the opening from the horizontal into the vertical branch.

Similar letters of reference designate like parts in the several figures of the drawings, as also in the drawings in Patent No. 339,471, to which special reference is hereby made.

The construction shown in Figs. 1 and 2 will be first described, and modifications will be subsequently referred to in connection with other figures.

My improved gas-producing apparatus includes two furnaces, which comprise compartments or chambers A A', situated below the exits L L', which are located approximately near the vertical center of the furnace. These chambers are provided with means for introducing air, steam, or gases for the purpose either of heating coke therein or of decomposing steam or gases. They are herein styled "generators" or "generating-chambers," such terms being customarily applied in the art to furnace-chambers adapted to generate gases by decomposition of steam. These chambers are preferably connected below the grate-bars or at the base by the flue C. Flues D D' for air-blasts and pipes G G' for steam and $H^2$ $H^3$ for gas enter both of the ash-pits below the grate bars. Suitable doors, B, are provided for cleaning the grates, removing ashes, and other purposes.

Flues or exits L L' connect the generating-chambers A A' from four to six feet above the grate-bars with the upper part of regenerative or heat-storing chambers E E', which are nearly filled with any suitable loosely-piled refractory material, such as fire-brick, lime, soapstone, or quartz rock. The chambers A A' are surmounted by compartments or chambers $A^2$ $A^3$, situated above the flues L L', and are directly connected therewith in order that hot gases may circulate freely through the space adjacent to the exits, and that the coal, when coked in the upper compartments, may pass freely down by gravity into the lower compartments below the flues L L'.

The main body of the apparatus is preferably covered with suitable non-conducting material, as indicated in Fig. 4, and the pipes and external conduits may be so covered. The coking-chambers are preferably fitted at the top with any suitable tight feeding apparatus or gas-tight covers, and openings with covers may be provided for clinker-bars, which can be used to facilitate the downward movement of the coke from the upper to the lower compartments. A pipe, $A^4$, controlled by valve $a^4$, connects the upper compartments at the top, and pipes $A^5$ $A^6$, controlled by valves $a^5$ $a^6$, may connect the upper part of said compartments with the upper part of the regenerative chambers. (See Fig. 3.)

The regenerative chambers E E' are supplied with hot-air-inlet conduits F F' and steam-inlet pipes $G^4$ and gas-inlet pipes $H^4$, which steam and gas pipes communicate with conduits F F' in the furnace-wall. This arrangement of steam and gas pipes is not essential, as steam-pipes (similarly indicated) connect with pipes $A^5$ $A^6$ and serve to supply steam to the top of the regenerators, and gas is ordinarily supplied through flues L L'.

M M' indicate oil-pipes, which have branches communicating directly with the coking and combustion chambers and other branches which communicate indirectly with the regenerator through the medium of flues L L'. The regenerators at their bases are supplied with gas-inlet pipes H, air-inlet pipes $F^2$, steam-inlet pipes $G^2$, outlets K K' for products of combustion, and outlets O O' for gas, all of which pipes, whether outlets or inlets, are provided with suitable controlling cocks or valves, as indicated.

The operation of the apparatus is preferably as follows: The chambers A A' $A^2$ $A^3$ are first filled with hard coal or coke and the openings at the top of the furnace are tightly closed. The valves $k$, controlling the outlets K K' for products of combustion, are then opened. The fuel is ignited on the line of the grate-bars, and air-blasts are admitted below the grate-bars through pipes D D', which urge combustion. The products of combustion, of which about twenty per cent. are carbonic oxide, which is combustible, and about eight per cent. carbonic acid and seventy-two per cent. nitrogen, which are incombustible, pass through flues L L' into the tops of the regenerative chambers E E'. Air, preferably heated by passing upward through flues in the walls of the regenerative chambers, is then admitted and the carbonic oxide burned. The highly-heated incombustible products of this second combustion (carbonic acid and nitrogen) pass down through the refractory material and out at the outlets K K', leaving their heat in the refractory material. When the fuel in the combustion-chambers has been raised to incandescence and the refractory material sufficiently heated, (as observed through properly-provided peep-holes,) the air-blasts are shut off. Jets of steam are then admitted, through pipes $G^4$, into the tops of the regenerative chambers, in order to drive out the incombustible gases remaining in the apparatus. The outlets K K' for products of combustion are then closed, and one of the outlets for gas—as, for example, O'—is opened by moving valve $o'$. Steam, air, or gas, or any desired mixture of the same, is then admitted at the bottom of chamber E through pipes $G^2$ $F^2$ H and is driven up through the heated refractory material, raising the steam or mixed gases to the temperature (about 2,000° Fahrenheit) necessary for their thorough decomposition when brought into contact with incandescent carbon. From the top of chamber E the mixed gases are driven through flue L into and down through the incandescent fuel in chamber A, then through the flue C, up and through the incandescent fuel in chamber A'. By their passage through the chamber E, where they are first highly superheated, then through and in intimate contact with the incandescent fuel in chambers A A', the gases are completely decomposed, and pure carbonic oxide and hydrogen, (provided that gas or steam only, or a mixture of them, is admitted to the superheating-chamber E,) enriched by the hydrocarbons derived from the coal, are the result. From the top of the combustion-chamber A' the hot gases are passed through the flue L' into the top of the regenerative or heat-storing chamber E', then down through the heated refractory material, wherein they are combined and fixed into a homogeneous gas, and out at the outlet to the gas-main O'. A test-burner, $t$, is attached to the main, and in case the gas needs still further enriching liquid hydrocarbons or their vapors may be introduced into chamber E' through the pipe M', and in their passage down through the heated refractory material they are combined and fixed with the other gases into a homogeneous gas of any desired candle-power, according to the quantity of oil or rich gases admitted through pipe M'.

While making gas, the oil-pipes may discharge oil directly into the coking-chambers above flues L L' by the branch pipe indicated in Fig. 4, wherein it is volatilized and vaporized by heat radiated and conducted directly from the combustion and regenerative chambers, and the vapors may pass from thence through the connecting-flues into the enriching and fixing chamber. Air alone, or a mixture of steam and air, may be used as a gaseous medium in the manufacture of gas and forced into and through the incandescent coke, provided that it is desired to generate a heating-gas which contains a portion of incombustible nitrogen.

A non-illuminating natural gas may be used as a gaseous medium, in the manufacture of gas, instead of steam, and converted into an illuminating-gas of high candle-power. This method is advantageous in regions where natural gas can be cheaply and abundantly obtained. As it contains a large proportion of light carbureted hydrogen ($CH_4$) and little or no oxygen, the heat of the fires in the generators is longer maintained, and it has been found necessary to highly heat hydrogen or natural gas in order to cause it to unite with the carbon and to hold it in combination until carried to the place of combustion. Water-gas, oxygen, hydrogen, carbonic oxide, carbonic acid, or light carbureted hydrogen may be used alone or in various mixtures and with or without steam, and passed through the incandescent coke; and gases produced in the generating-chamber, as hereinbefore described, may be enriched by mingling the same with natural gas, and then fixing the mixture in the regenerative chambers.

As the inlets and outlets to the regenerative chambers E E' are similar, the operation of gas-making be reversed at will, according to the condition of the fuel and regenerative chambers. For instance, after heating up the apparatus steam, air, or gas, or any desired mixture of them, may be passed into the base of chamber E' and through the combustion-chambers, and the resulting gases may be combined and fixed in chamber E, and the gases passed out of the apparatus through the outlet O. The gas-outlets O O' may discharge into a common water-seal or hydraulic main, and the waste products of the combustion may also be discharged into a single chimney or smoke-stack, as indicated in Fig. 3. The several chambers, connecting-flues, outlets, and other parts illustrated in Figs. 1 and 2 can be arranged in line, if desired, though such arrangement is not preferred.

The combustion-chambers A A' are supplied with additional hot fuel as fast as it is consumed by the coal or coke in the upper chambers, $A^2$ $A^3$, descending by gravity. Clinker bars or rods can be introduced through openings $z$ $z$ to break up adhering fuel and hasten its descent, if desired. As the coke or hard fuel first supplied sinks down in the upper chambers, $A^2$ $A^3$, fresh bituminous coal is supplied through the openings at the tops of the chambers after each run of gas, or as required. Preferably these openings or fuel-chutes are provided each with a valve at the top, and also at the bottom, in a well-known form, as indicated in Fig. 1, in order to prevent the escape of gas while charging coal into the furnace. As the coal enters the chambers $A^2$ $A^3$, it is exposed to heat radiated directly and continuously from the combustion-chambers and regenerators, and its volatile hydrocarbons are thrown off during its descent through the upper chambers, $A^2$ $A^3$.

While heating up the apparatus in the manner above described, the rich gases evolved in the coking-chambers may pass down through the coal into the combustion-chambers, or through the pipes $A^5$ $A^6$ into the regenerators, where they will mingle with the products of combustion passing through flues L L' and with the air entering the upper parts of the regenerators through ports connected with the vertical flues F F' and be burned, and thus aid in quickly heating the regenerative chambers previous to making gas.

In case the coal-gas or a part of it is allowed to pass into the regenerators through pipes $A^5$ $A^6$, the valves may be partially closed, if necessary, to prevent products of combustion from passing through the bituminous coal from below. Ordinarily the pressure in the generating or combustion chamber will not be sufficient to carry the products of combustion much above the flues L L'.

While making gas, in case the chamber E is used as a superheating-chamber and the chamber E' as a combining and fixing chamber, the coal-gas valve $a^5$ is closed and the valves $a^4$ and $a^6$ (see Figs. 2 and 4) are wholly or partially opened, thus directing the rich coal and oil gases from both coking-chambers through pipe $A^6$ into the top of the combining and fixing chamber E', where they are mixed with water-gas generated in the lower chambers and aid in enriching and carbureting said gases; or, when operating the apparatus in a reverse direction, the rich coal and oil gases generated in the coking chambers $A^2 A^3$ may in like manner be directed into chamber E. Under some circumstances more or less coal-gas may be passed from the coking-chamber nearest the regenerator, which is in use as a fixing-chamber, out of the bottom of the bituminous coal and above the incandescent coke directly into conduit L.

It will be understood that in heating up the coke by an air-blast in chambers A A' the valves in pipes $A^6 A^5$ may be wholly or partially closed. When the coke has been made incandescent and steam or gases are thereupon introduced into the same, these valves may be partially opened and regulated, so that the gases expelled from the fresh coal in the coking-chambers may pass, as above described, into the fixing-chamber through the pipes. A test-burner, $t^2$, on pipe $A^4$, furnishes the means of determining the character of these gases, which may be varied by opening the valves more or less to allow a suitable portion of the water-gas to ascend through the coal and mingle with the coal-gases. All of the gas made in the chambers A A' may be made to pass out through exits L L'; but, preferably, a regulable portion is allowed to ascend in chambers $A^2 A^3$ and pass out through the valved pipes, together with the coal-gases, with the effect to aid in heating the bituminous coal in the upper compartments and partially mix the various gases.

By this method of manufacturing water-gas and utilizing bituminous coal less oil will be required to enrich the gas to the desired candle-power, and the coke and the tar, which are the principal products (or so-called "residuals") of coal gas works, may thus be completely utilized and wholly applied to the manufacture of gas.

It will be seen that the apparatus may be divided and made into two separate and complete sets of generators and fixing-chambers by closing the flue C, (and the pipe $A^4$,) as by placing a valve or diaphragm on the dotted line $x x$, or by closing the flue C with masonry, or in any suitable manner. Then, after heating up the apparatus, as before described, air, steam, or gas, or any mixture of them, may be driven into the ash-pits below the grate-bars through pipes D D' G G' $H^2 H^3$ and passed up through the combustion-chambers A A', and the resulting gases through flues L L' into the side regenerative chambers, E E', where they may be enriched with the volatile hydrocarbons liberated in the coking-chambers, and with oil-vapors, as described, and combined and fixed by passing them down through the heated refractory material in chambers E E'. This method of operating is according to my invention, and is convenient when it is desired to restrict the manufacture of the gas to the use of one side of the apparatus, as when it is necessary to suspend operations in one part of the apparatus for repairs, although less satisfactory results are obtained, for the well-known reason that the steam partially puts out the fire when driven in at the base of the combustion-chambers, and experience has demonstrated that the decomposition of the gaseous media used in making gas is less perfect and complete when they are not first superheated and when they are passed through only a single bed of incandescent fuel to be decomposed.

With the outlets for the products of combustion may be connected means for exhausting from the apparatus. In the present instance a chimney is illustrated, though a steam-jet or a mechanical exhausting apparatus might be employed in connection with the outlet. The use of an exhausting device and a valved outlet gives more perfect control of the circulation of the heating gases, and provides for an efficient downdraft in deep generators. The combination of an exhausting device with a downdraft regenerative chamber and with a coking-chamber placed above the exit from the fuel chamber and having a tightly-closed feeding-chamber is the subject of my application No. 208,716, filed July 22, 1886, and is not herein specifically claimed.

Steam-pipes $G^4$, provided with stop cocks, are connected with the pipes $A^5 A^6$ for use under special conditions, as when it may for any reason be desired in commencing operation or at other times to more suddenly raise the temperature in the coking-chambers. The invention, however, obviates the evils resulting from the constant and compulsory passage of products through the coking-chamber, and the steam-pipes above described are provided to give more thorough control of the temperature and of the evolution of the hydrocarbon gases in the coking-chamber under exceptional circumstances. These steam-pipes admit steam to the regenerators, as before stated.

It will be seen that the present arrangement of the regenerators and the fuel-chamber leaves a large space below the latter, and that this is utilized for the collection and removal of ashes. Preferably, close ash-chambers having tightly-closing doors are provided immediately below the grates, as indicated, and spaces left below these, into which a truck or wagon may run, as has heretofore been practiced in metallurgic furnaces. The upper doors, $B^2 B^3$, give access to the upper surface of the grates, and the lower doors provide for occasionally dropping the refuse. The whole space below each grate might, if desired, be thrown into one chamber made gas-tight and provided with a closely-fitting door; but the construction illustrated is preferable.

In the above-described mode of procedure steam is preferably passed into the incandescent coke to be decomposed to produce water-gas, which is subsequently enriched, as specified. If air is passed into the incandescent coke, so-called "producer-gas" is generated, which is then enriched, the final product in such case containing nitrogen. Carbonic acid might be passed into the incandescent coke to produce carbonic oxide, which latter gas could be enriched in the described manner; and if a mixture of two or more of these is employed the character of the gas generated in the incandescent coke will be correspondingly modified. The present improvement, however, does not relate to these differences, but principally to other steps of procedure, as hereinafter pointed out.

It will be understood that I do not limit myself to the precise arrangements and details of my improved apparatus as hereinbefore described with reference to the accompanying drawings, as the construction may be variously modified without departing from the nature of my invention—as, for instance, the hot products of combustion and gases may be passed into the base of regenerative chambers and out at their tops or sides; the regenerators may be placed directly beneath the combustion-chambers; the apparatus may be constructed all in one or in two structures with suitable dividing gas-tight walls, and the details of the construction of the combined combustion and coking chambers may be modified without radical departure from my invention—as, for example, by varying somewhat the contour or relative size of said chambers, none of the variations noted being substantially inconsistent with the described construction and operation of the coking and generating chambers.

In the form shown in Fig. 1 each generating-chamber is represented as made wider than a coking-chamber. This greater width of the generators provides space in the furnace-top for the opening $z$ above the generator, through which to introduce a bar for breaking up the fuel or removing clinkers. Such space and opening might be provided by slightly contracting the bottom of the coking-chamber, which, however, would tend to prevent the free descent of coke from the upper to the lower chamber. Any material contraction of the coking-chamber at its lower end is inconsistent with my improvement; and, further, it is highly desirable that the generator should be larger horizontally than the coking-chambers. A difference in the relative widths of the generators and coking-chambers is indicated in the several figures of the drawings. This difference may be varied in extent, and may be produced on one or all sides of the furnace. The generating and coking chambers are not distinct in the sense that they are entirely or separately inclosed; but as the parts of the furnace above and those at and below the exits L L' have substantially different relations to the operation of the apparatus, they are for convenience of description referred to as "coking" and "generating" or "combustion" chambers.

It is characteristic of my improvement that the coking-chamber is in free and open communication with the generating-chamber, and that a common exit, such as L, is provided near the bottom of the former and top of the latter, or at about the mid-height of the furnace, the construction being such that, first, distilled gases from the first-named chamber and the "generated" gases from the second may pass out of a common exit-flue when desired; that, second, coal may be coked by heat from the gas-generator without the passage therethrough of products of combustion, the communication between the two chambers being open and unobstructed, and that, third, coke can freely descend by gravity from the coking-chamber into the generator without the necessity of opening the furnace or retorts.

To provide for the two last-named objects, and particularly for the easy descent of coal in the coking-chamber, and for the free delivery of the same, when coked, into the generating-chamber, it is essential that the coking-chamber should not be materially contracted in its lower part. I therefore make the bottom of the coking-chamber, which is adjacent to the exit L, about as large horizontally as any part of the same, and this is an essential feature, for were the bottom of the coking-chamber contracted in any considerable degree, or if said chamber communicated with the combustion-chamber below by a contracted passage instead of the wide and open passage, substantially as illustrated, such contraction would not only interfere with the upward radiation of heat and its conduction through the coal, but it would, in operation, produce a choking or clogging by the bituminous coal in the coking-chamber, owing to the well-known liability of such coal to become agglomerated in masses and adherent to furnace-walls. This part of the furnace adjacent to the exit-flue L and at the bottom of the coking-chamber constitutes a passage for descending materials, and, being made of a horizontal area not materially less than that of the main body of the coking-chamber, adequate provision is thereby made for heat to pass up into the same and for the coke to pass downwardly, and also distilled gases when desired. Such passages will ordinarily be filled with coke, while the main part of the chamber above will contain bituminous coal and such coal partially coked. As coke descends below the exit L, it is subjected to the action of air, steam, and gases introduced at the bottom of the fuel-chamber and regenerator. It will be understood, therefore, that in this connection the term "passage" is applied to that part of the herein-described furnace through which materials pass from the chamber above the exit-flue L into the chamber below the level of said flue.

I do not herein claim decomposing steam by the aid of incandescent coal or coke, enriching the gases resulting from such decomposition with vapors and gases, whether produced by vaporizing oil or heating bituminous coal and then fixing the enriched gases, as such process is old and has been conducted by the use of various apparatus. Neither do I claim any process which embraces as a part thereof causing distillation of fresh charges of bituminous coal in contact with bodies of incandescent fuel and passing evolved gas and vapor (or coal-gas) and water-gas from below the recently-charged coal into a second body of fuel below its surface and down through it; nor do I claim herein a process in which the products of combustion are passed through bituminous coal, nor one in which either air or the whole body of non-illuminating gas is passed into or through bituminous coal at any stage thereof, nor one in which non-illuminating gas is purified and stored in a holder before it is enriched, nor a process in which externally-heated retorts are employed to fix the gas, nor one in which coke is removed from the furnace, nor one in which illuminating and non-illuminating gases are simultaneously produced and conducted away in different directions for separate use.

Heretofore a chamber for bituminous coal has been located above a combustion-chamber; but the two chambers were separated by a perforated arch through which a very little coke could pass, a side door being necessary for its removal, and a distinct charging apparatus for supplying coke to the generator being also required, whereby much gas and heat were wasted. In other furnaces heretofore proposed the lower end of an upper chamber was too contracted to permit the use of bituminous coal; and in another form, which was not liable to the said objections, no provision was made for the removal of ashes and refuse except as slag, which latter would clog the exit and render such construction inoperative for my purposes. My chamber or retort for bituminous coal is located at the upper part of the furnace and entirely above the exit from the gas-generator, and it is heated by conduction and radiation from below. The natural tendency of the upper part of a furnace to become highly heated is utilized to distill soft coal. The passing of products of combustion through such coal charged from time to time is objectionable, as it burns or carbonizes the hydrogen vapors and unduly heats the upper part of the furnace and the coal contained therein. It also expels volatile and gaseous hydrocarbons too suddenly from the bituminous coal, with the effect to make the mixed gases introduced into the fixing-chamber for the time too rich in carbon and proportionately too poor thereafter. A more gradual expulsion of such hydrocarbons by the direct contact of radiated heat and the regulable admission of hot gas from the generating-chamber by my process, while utilizing heat which would otherwise be lost by conduction and radiation into the open air in an upward direction, is a characteristic of my improvement, and these advantages are secured in a method of procedure wherein hot gases or products are always passed downwardly in the brick-work chambers, and wherein, also, coal may be charged at any time without interrupting the process of gas-making. It also provides for conducting hydrocarbon gases and vapors from the upper part of the coking chamber or space to a regenerative chamber and from either of two coking-chambers to the other. It also provides that gas or steam, or a mixture of these, may be passed through a regenerating or superheating chamber and through both generating-chambers and a fixing-chamber without quenching the fires at the base, and then the operation reversed.

Several of the above advantages have been heretofore secured more or less efficiently. My claim of invention pertains to the matters hereinafter pointed out, whereby I provide means for securing combined advantages not before attained.

Having thus described my invention, what I desire to claim and secure by Letters Patent is—

1. The process of generating gas, which consists in admitting air simultaneously to two connected bodies of fuel at the bottom to render the base of the same incandescent, air being also admitted above the incandescent fuel to burn the products of partial combustion, passing the resulting hot gases downward through chambers loosely filled with refractory material to heat the same, simultaneously heating comparatively fresh fuel by the direct radiation and conduction of heat from the combustion and regenerative chambers, thereby causing it to throw off its volatile gases, as described, passing steam upward through a superheating-chamber and through the two connected bodies of fuel, thereby decomposing the steam, passing the volatile gases distilled from bituminous coal off above the incandescent coke directly into the fixing-chamber and without passage through the body of said coke, oil-vapors being introduced, if desired, and finally passing the resulting gases downward through the heated brick-work in the fixing-chamber, thereby combining the mixed heated gases into a homogeneous gas.

2. The steps in the process of manufacturing gas, which consist in supplying coke gradually by gravity to a generating-chamber, rendering it incandescent by an air-supply, decomposing steam by said coke, and passing a regulable portion of the water-gas thus produced through bituminous coal suitably supplied at intervals to the coking-chambers, substantially as set forth, whereby coke may be automatically and continuously supplied to a generator and without opening the furnace, and whereby the coal may be heated to a desired temperature by a regulable portion of the gas generated by decomposition of steam.

In testimony whereof I affix my signature in presence of two witnesses.

HENRY C. REW.

Witnesses:
GEORGE W. NORTHRUP, Jr.,
ARTHUR W. HALE.